US006848298B2

(12) United States Patent
Miyahara et al.
(10) Patent No.: US 6,848,298 B2
(45) Date of Patent: Feb. 1, 2005

(54) APPARATUS AND METHOD FOR FAILURE DIAGNOSIS OF FUEL VAPOR PURGE SYSTEM

(75) Inventors: Hideki Miyahara, Nishikamo-gun (JP); Tokiji Ito, Toyota (JP); Shuichi Hanai, Toyota (JP); Akira Ichikawa, Chiryu (JP); Kenji Nagasaki, Nagoya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 10/319,685

(22) Filed: Dec. 16, 2002

(65) Prior Publication Data

US 2003/0131655 A1 Jul. 17, 2003

(30) Foreign Application Priority Data

Jan. 11, 2002 (JP) ....................................... 2002-005204
Feb. 7, 2002 (JP) ....................................... 2002-030696

(51) Int. Cl.[7] .................................................. G01N 3/04
(52) U.S. Cl. .......................................... 73/49.2; 702/51
(58) Field of Search ................................ 73/40, 40.5 R, 73/49.7, 118.1; 123/518, 519, 520; 702/51

(56) References Cited

U.S. PATENT DOCUMENTS 5,263,462 A * 11/1993 Reddy ........................ 123/520
5,295,472 A * 3/1994 Otsuka et al. .............. 123/520
5,297,527 A * 3/1994 Suzuki et al. ............... 123/520
5,349,935 A * 9/1994 Mezger et al. .............. 123/520
5,526,679 A * 6/1996 Filippi et al. ............ 73/40.5 R
5,575,265 A * 11/1996 Kurihara et al. ............ 123/520
5,731,514 A * 3/1998 Miwa et al. ............... 73/118.1
5,890,474 A * 4/1999 Schnaibel et al. .......... 123/520
6,182,642 B1 * 2/2001 Ohkuma ..................... 123/520
6,389,882 B1 * 5/2002 Ohkuma ..................... 73/49.7
6,460,518 B1 * 10/2002 Streib ......................... 123/520
2001/0029776 A1 10/2001 Streib
2003/0192370 A1 * 10/2003 Amano et al. ............. 73/118.1

FOREIGN PATENT DOCUMENTS

JP A 6-502006 3/1994
JP A 6-346801 12/1994
JP A 10-90107 4/1998
JP A 2000-186632 7/2000
JP A 2000-205056 7/2000

* cited by examiner

*Primary Examiner*—Charles D. Garber
(74) *Attorney, Agent, or Firm*—Oliff & Berridge, PLC

(57) ABSTRACT

A fuel vapor purge system includes a fuel tank, a canister, and an evaporation route, and purges fuel vapor collected in the canister into an intake passage of an internal combustion engine. A failure diagnosis apparatus of the fuel vapor purge system includes a controller having a pressure difference applying unit for applying a pressure difference between the evaporation route and outside air. The controller also detects a level of an influence of the fuel vapor generated in the fuel tank on failure determination of the evaporation route, and detects both a pressure state obtained when the pressure difference applying unit communicates with a reference orifice communicating with the outside air and a pressure state obtained when the pressure difference applying unit communicates with the evaporation route. The failure diagnosis apparatus determines whether there is a failure in the evaporation route in view of the level of the influence by comparing the detected pressure states with each other.

15 Claims, 7 Drawing Sheets

APPARATUS AND METHOD FOR FAILURE DIAGNOSIS OF FUEL VAPOR PURGE SYSTEM

INCORPORATION BY REFERENCE

The Disclosures Of Japanese Patent Applications No. 2002-005204 Filed On Jan. 11, 2002 And No. 2002-030696 Filed On Feb. 7, 2002, Including The Specification, Drawings And Abstract Are Incorporated Herein By Reference In Their Entireties.

BACKGROUND OF THE INVENTION

1. Field of Invention

The invention relates to a failure diagnosis apparatus and method of a fuel vapor purge system for purging fuel vapor generated in a fuel tank into an intake system.

2. Description of Related Art

A vehicle having a volatile liquid fuel tank commonly uses a so-called fuel vapor purge system. In a typical purge system, fuel vapor generated in a fuel tank is collected into a canister through a vapor passage. The fuel vapor thus collected is then purged into an intake passage of an internal combustion engine through a purge passage.

In order to ensure reliability of such a fuel vapor purge system, many purge systems incorporate a failure diagnosis apparatus for detecting leakage caused by a hole, damage, and the like in an evaporation route (which includes a fuel tank, a vapor passage, a canister and a purge passage). Whether there is such a leakage failure in the evaporation route can be determined by providing a pressure difference between the inside and the outside of the evaporation route, and detecting the behavior of the internal pressure of the evaporation route. The level of the internal pressure determined in a state where there is no leakage in the evaporation route is then compared with the detected behavior of the internal pressure.

Japanese Patent Laid-Open Publication No. 10-90107 proposes such a failure diagnosis apparatus of a fuel vapor purge system. This failure diagnosis apparatus pressurizes the inside of an evaporation route by delivering air under pressure into the evaporation route by an electric pump while an internal combustion engine is stopped. The failure diagnosis apparatus then determines whether there is a leakage failure in the evaporation route based on the behavior of the internal pressure of the evaporation route. A mechanical load on the electric pump varies according to the internal pressure of the evaporation route. Therefore, current consumption of the electric pump also varies accordingly. As such, the internal pressure of the evaporation route can be detected based on the current consumption of the electric pump. That is, if there is leakage in the evaporation route, the internal pressure of the evaporation route is less likely to vary. Therefore, the mechanical load on the electric pump does not increase from the beginning of the pressurization process, and current consumption of the electric pump remains low. In contrast, if there is no leakage in the evaporation route, the mechanical load on the electric pump increases as the evaporation route is pressurized. As a result, current consumption of the electric pump increases accordingly. In this way, whether there is a leakage failure in the evaporation route can be determined based on the current consumption of the electric pump in the pressurization process.

The electric pump degrades over time and detection accuracy of a leakage failure in the evaporation route declines because the pressurization capability of the electric pump with respect to the current consumption thereof is reduced. Therefore, in such a failure diagnosis apparatus, the electric pump is connected to a reference orifice having the same diameter as that of a hole to be detected as abnormal, and the reference orifice is pressurized by the electric pump. Current consumption of the electric pump during pressurization of the reference orifice is used as a reference level for abnormality detection. Reduction in detection accuracy can be prevented by comparing current consumption of the electric pump during pressurization of the evaporation route with the reference level.

In the failure diagnosis apparatus of the above publication, however, a route which is pressurized by the electric pump in order to detect a leakage failure is different from a route which is pressurized by the electric pump in order to pressurize the reference orifice. Accordingly, a pressure change caused by the fuel vapor generated in a fuel tank is included only when the internal pressure detects a leakage failure, and is not included when the reference orifice is pressurized. In other words, a current corresponding to the pressure change caused by the fuel vapor is included in the current consumption of the electric pump during a leakage failure diagnosis process. However, a current corresponding to the pressure change caused by the fuel vapor is not included in current consumption (reference level) of the electric pump during pressurization of the reference orifice. This results in reduced detection accuracy of a leakage failure in the evaporation route. It is therefore impossible to accurately detect a leakage failure.

SUMMARY OF THE INVENTION

The present invention is made in view of the above problems. It is an object of the invention to provide a failure diagnosis apparatus of a fuel vapor purge system which is capable of detecting a leakage failure in an evaporation route with improved accuracy.

According to an exemplary embodiment of the invention, a fuel vapor purge system includes a fuel tank, a canister, an evaporation route and a controller. The fuel vapor purge system purges fuel vapor collected in the canister into an intake passage of an internal combustion engine. The evaporation route includes the fuel tank, the canister, an evaporation passage for conducting fuel vapor generated in the fuel tank into the canister, and a purge passage for purging fuel vapor collected in the canister into an intake passage of an internal combustion engine.

A failure diagnosis apparatus of the fuel vapor purge system includes a controller. The controller includes a pressure difference applying unit for applying a pressure difference between the evaporation route and outside air, and detects a level of an influence of the fuel vapor generated in the fuel tank on failure determination of the evaporation route. The controller detects both a pressure state obtained when the pressure difference applying unit communicates with a reference orifice that communicates with the outside air and a pressure state obtained when the pressure difference applying unit communicates with the evaporation route. The failure diagnosis apparatus thus determines whether there is a failure in the evaporation route, in view of the level of the influence by comparing the former pressure state with the latter pressure state.

According to an exemplary embodiment of the invention, a failure diagnosis method of the above fuel vapor purge system includes the steps of: detecting a level of an influence of the fuel vapor generated in the fuel tank on failure determination of the evaporation route; detecting a pressure state obtained when a pressure difference applying unit for applying a pressure difference between the evaporation route and outside air communicates with a reference orifice communicating with the outside air; detecting a pressure state obtained when the pressure difference applying unit communicates with the evaporation route; and determining whether there is a failure in the evaporation route, in view of the level of the influence by comparing the former pressure state with the latter pressure state.

In various exemplary embodiments of the present invention, the failure diagnosis apparatus and method of the fuel vapor purge system determines whether there is a failure in the evaporation route in view of the level of the influence of the fuel vapor generated in the fuel tank on failure determination. Therefore, whether there is a leakage failure can be determined with improved accuracy. It should be appreciated that whether there is a leakage failure in the evaporation route is determined based on the comparison between the pressure state obtained by applying a differential pressure to the reference orifice, with the pressure state obtained by applying a differential pressure to the evaporation route. Therefore, reduction in determination accuracy of a leakage failure due to aging of the pressure difference applying unit can be prevented.

BRIEF DESCRIPTION OF THE DRAWINGS

The above mentioned and other objects, features, advantages, technical and industrial significances of this invention will be better understood by reading the following detailed description of preferred embodiments of the invention, when considered in connection with the accompanying drawings, in which.

DETAILED DESCRIPTION OF PREFERRED EMBODIMENTS

In the following description and the accompanying drawings, the invention will be described in more detail with reference to exemplary embodiments.

A failure diagnosis apparatus of a fuel vapor purge system mounted on a vehicle and the like will be described with reference to FIGS. 1 to 9.

Figure 1:
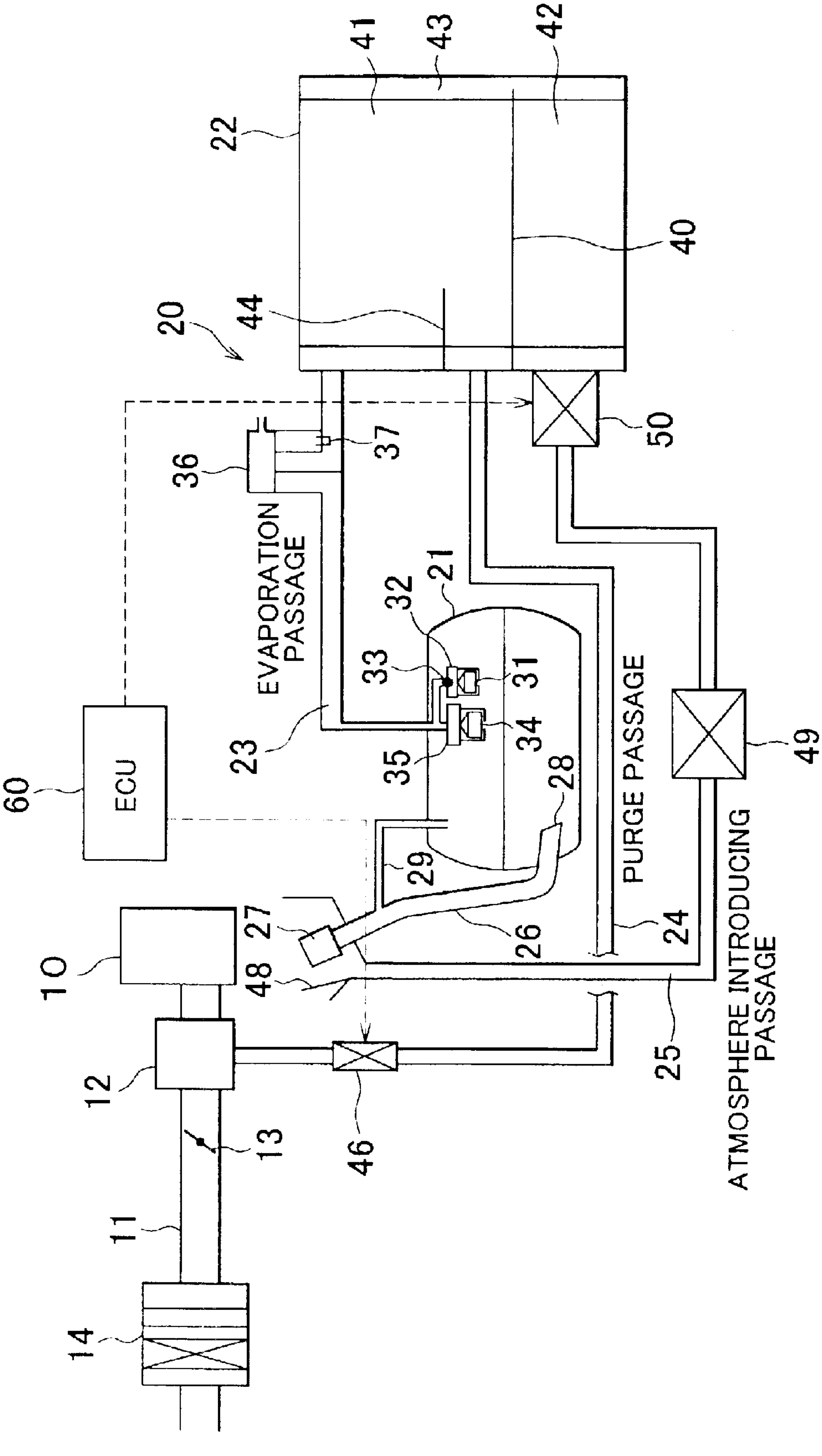
FIG. 1 schematically shows the structure of a failure diagnosis apparatus of a fuel vapor purge system according to a first embodiment of the invention.

FIG. 1 schematically shows the structure of a fuel vapor purge system and a failure diagnosis apparatus according to a first embodiment. As shown in FIG. 1, a throttle valve 13 and an air cleaner 14 are provided in an intake passage 11 for introducing intake air into an internal combustion engine 10. The throttle valve 13 is provided upstream of a surge tank 12, and the air cleaner 14 is provided upstream of the throttle valve 13.

The fuel vapor purge system 20 of FIG. 1 forms a part of the engine, and includes a canister 22 for adsorbing fuel vapor generated in a fuel tank 21, an evaporation passage 23 that allows the fuel tank 21 and the canister 22 to communicate with each other, and a purge passage 24 that allows the canister 22 and the intake passage 11 to communicate with each other. The fuel vapor purge system 20 further includes an atmosphere introducing passage 25 for introducing the atmosphere into the canister 22.

A fuel filler pipe 26 for fuel supply is attached to the fuel tank 21. A cap 27 is mounted to an inlet port of the fuel filler pipe 26, and a check valve 28 is provided at an outlet port of the fuel filler pipe 26. A circulating path 29 is connected to a middle part of the fuel filler pipe 26. An open end of the circulating path 29 is located in the upper space of the fuel tank 21.

In addition to the circulating path 29, one end of the evaporation passage 23 is disposed near the upper wall of the fuel tank 21. The evaporation passage 23 branches into two passages at this end. In one of the two passages, a float valve 31, a reservoir portion 32 and an orifice 33 are provided sequentially from the open end of one of the passages. In the other of the passages, a float valve 34 and a reservoir portion 35 are provided sequentially from the open end of the passage.

In the evaporation passage 23, an internal pressure valve 36 and an aperture 37 are provided near the canister 22. When the pressure in the fuel tank 21 is lower than the opening pressure of the internal pressure valve 36, a diaphragm of the internal pressure valve 36 is located at a closed position. As a result, the fuel tank 21 and the canister 22 communicate with each other through the aperture 37.

When the pressure in the fuel tank 21 reaches the opening pressure of the internal pressure valve 36, the diaphragm of the internal pressure valve 36 is displaced to an open position against the energizing force. As a result, fuel vapor generated in the fuel tank 21 is introduced into the canister 22 through the evaporation passage 23 without passing through the aperture 37. In the exemplary embodiment, the diaphragm of the internal pressure valve 36 is energized by a spring (not shown), and is subjected to atmospheric pressure. As a result, fuel vapor generated in the fuel tank 21 is introduced into the canister 22 through the evaporation passage 23 and the aperture 37 until the pressure in the fuel tank 21 reaches the opening pressure of the internal pressure valve 36.

The canister 22 contains an adsorbent. The adsorbent adsorbs the fuel vapor received from the fuel tank 21. The fuel vapor is thus temporarily stored in the canister 22. The fuel vapor adsorbed by the adsorbent can be desorbed if the canister 22 is subjected to a negative pressure. The canister 22 is divided into two adsorbent chambers 41, 42 by a partition plate 40. The adsorbent chambers 41, 42 are filled with an adsorbent, and communicate with each other through an air-permeable filter 43. The adsorbent chamber 41 communicates with the fuel tank 21 through the evaporation passage 23, and also communicates with the surge tank 12 in the intake passage 11 through the purge passage 24. The adsorbent chamber 42 communicates with the atmosphere introducing passage 25. The canister 22 has a guide member 44 in order to ensure that the fuel vapor received from the fuel tank 21 passes through the adsorbent before being introduced into the purge passage 24.

A purge control valve 46, such as an electromagnetic valve, or the like, is provided in the purge passage 24. The purge control valve 46 is normally closed. When the purge control valve 46 is opened, an intake negative pressure generated in the surge tank 12 during operation of the engine 10 is introduced into the canister 22 through the purge passage 24.

The atmosphere introducing passage 25 connects an inlet port 48 to a fresh-air introducing port 22*a* (see FIGS. 2 and 3) of the canister 22. The inlet port 48 is provided within a fuel supply opening which is opened and closed by a fuel lid (not shown). The atmosphere introducing passage 25 introduces the atmosphere from the inlet port 48 into the canister 22. An atmosphere dust filter 49 is provided in the atmosphere introducing passage 25. An electric pump module 50 is provided at the junction between the atmosphere introducing passage 25 and the fresh-air introducing port 22*a* of the canister 22. The electric pump module 50 forms a pressure-difference applying means.

Figure 2:
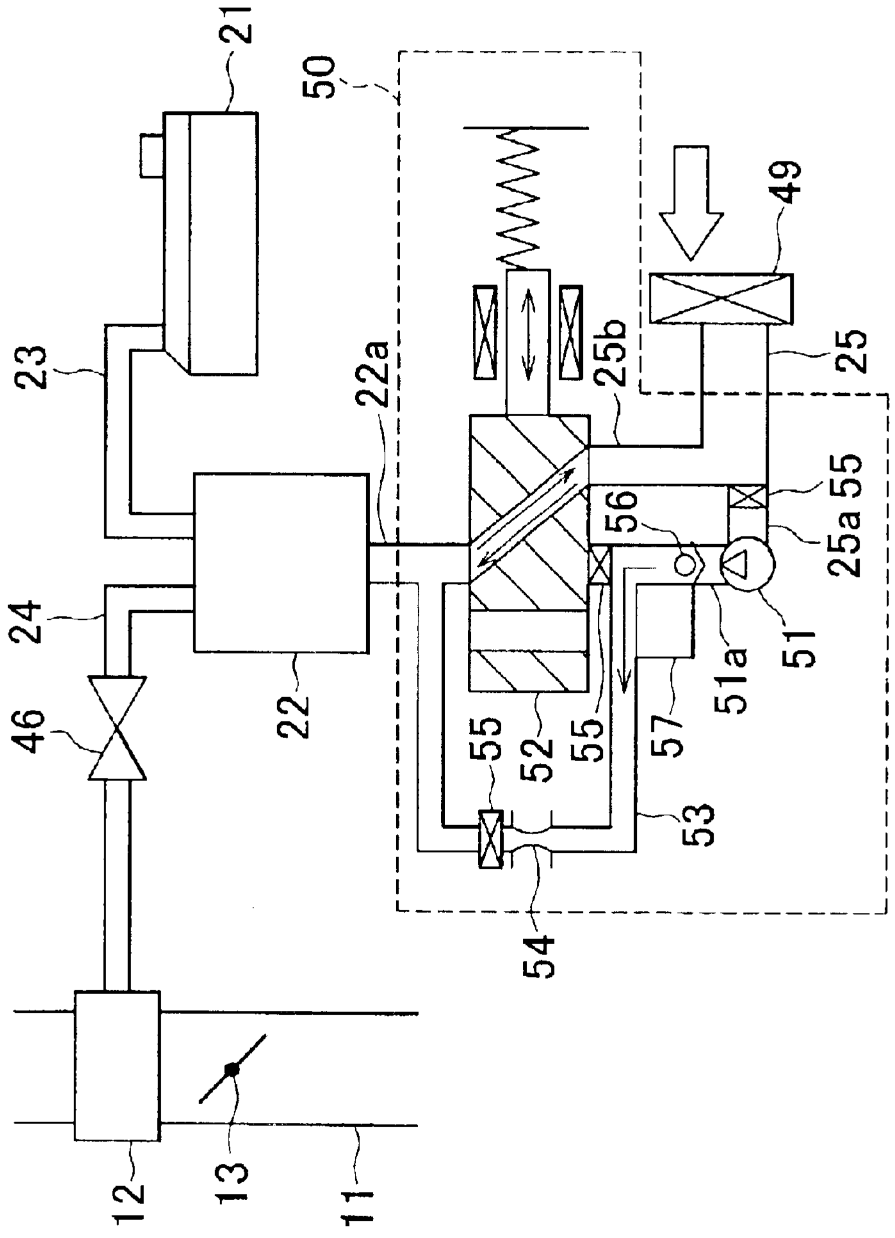
FIG. 2 illustrates the state of an electric pump module which is realized when atmospheric pressure is introduced and when a reference orifice is pressurized in the first embodiment of the invention.
Figure 3:
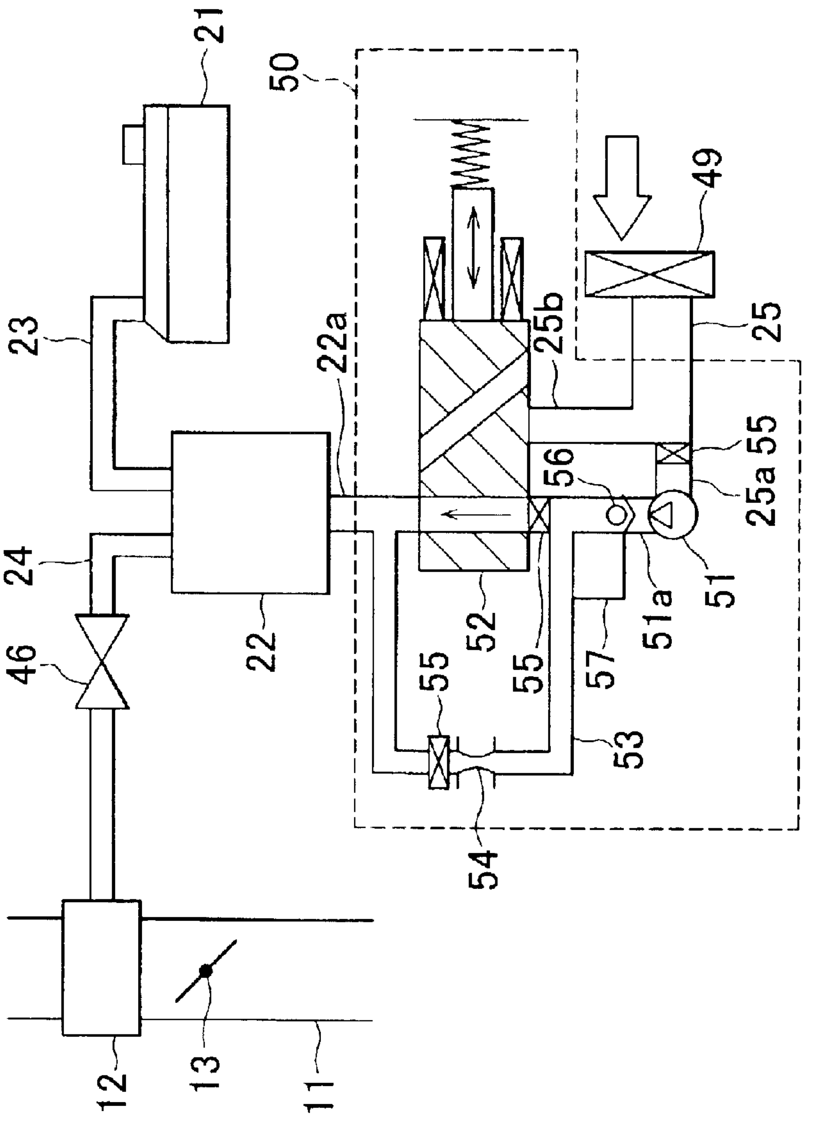
FIG. 3 illustrates the state of the electric pump which is realized when the amount of fuel vapor generated is detected and when an evaporation route is pressurized in the first embodiment of the invention.

As shown in FIGS. 2 and 3, the electric pump module 50 includes an electric air pump 51. The electric air pump 51 is connected to an atmosphere inlet port 25*a* branching from the atmosphere introducing passage 25. The electric pump module 50 further includes an electromagnetic switch valve 52. The switch valve 52 selectively connects the fresh-air introducing port 22*a* of the canister 22 to an atmosphere release port 25*b* of the atmosphere introducing passage 25 and a discharge port 51*a* of the electric air pump 51. A bypass passage 53 bypassing the switch valve 52 extends from the discharge port 51*a* of the electric air pump 51 to the fresh-air introducing port 22*a* of the canister 22. The bypass passage 53 has a reference orifice 54 having a reference diameter (e.g., 0.5 mm). The electric pump module 50 further includes three air filters 55 each disposed at the atmosphere inlet port 25*a*, downstream of the reference orifice 54, and at the discharge port 51*a* of the electric air pump 51.

When the switch valve 52 is OFF, the fresh-air introducing port 22*a* of the canister 22 is connected to the atmosphere release port 25*b*. When the switch valve 52 is ON, the fresh-air introducing port 22*a* of the canister 22 is connected to the electric air pump 51. The switch valve 52 is normally OFF. Therefore, the fresh-air introducing port 22*a* of the canister 22 normally communicates with the atmosphere release port 25*b*.

A check valve 56 serving as a cut-off means is provided at the discharge port 51*a* of the electric air pump 51 at an upstream position of the bypass passage 53. The check valve 56 is opened only when the pressure at the discharge port 51*a* of the electric air pump 51 is higher than the pressure in an evaporation route. In the open state, the check valve 56 allows the air to flow from the electric air pump 51 toward the evaporation route. When the pressure at the discharge port 51*a* of the electric air pump 51 is lower than the pressure in the evaporation route, the check valve 56 is closed and disconnects the evaporation route from the outside air. The electric pump module 50 further includes a pressure sensor 57 for detecting a pressure between the check valve 56 and the switch valve 52 and outputting an electric signal according to the detected pressure. An absolute pressure sensor may be used as the pressure sensor 57.

In an exemplary embodiment of the fuel vapor purge system 20, fuel vapor generated in the fuel tank 21 is introduced into the canister 22 through the evaporation passage 23 and adsorbed in the canister 22. When the purge control valve 46 is opened, a negative pressure in the surge tank 12 is supplied to the canister 22 through the purge passage 24. At the same time, the atmosphere is introduced into the canister 22 through the atmosphere introducing passage 25, the atmosphere dust filter 49, the atmosphere release port 25*b*, the switch valve 52 and the fresh-air introducing port 22*a*. Since the atmosphere is thus introduced into the canister 22, the adsorbed fuel vapor is purged (discharged) from the canister 22 into the surge tank 12.

When the control valve 46 is closed and the switch valve 52 is switched to the electric air pump 51 while the engine 16 and the vehicle are stopped, the space within the fuel vapor purge system 20, i.e., the space within the evaporation route, is closed. The evaporation route of the fuel vapor purge system 20 is a route that includes the fuel tank 21, the evaporation passage 23, the canister 22, and a portion of the purge passage 24 located between the canister 22 and the purge control valve 46. A failure diagnosis process described below is conducted with the space within the evaporation route of the fuel vapor purge system 20 being closed.

In the engine 10, the fuel vapor purge system 20 and the failure diagnosis apparatus thereof, the outputs of various sensors such as the pressure sensor 57 function as a control system of the engine, and are applied to an electric control unit (ECU) 60 functioning as a failure diagnosis apparatus. The ECU 60 has a microcomputer including a CPU (Central Processing Unit), a ROM (Read Only Memory), a RAM (Random Access Memory), an A-D (Analog-to-Digital) converter, an I/O (Input/Output) interface and the like. The ECU 60 receives signals from various sensors. These sensors may include the pressure sensor 57, a crank angle sensor, an air flow meter, an air-fuel ratio sensor (oxygen sensor), a vehicle speed sensor, and the like. The crank angle sensor (not shown) outputs a crank angle sensor in synchronization with rotation of the engine 10, and thus can detect the engine speed. The air flow meter (not shown) measures the intake air amount. The air-fuel ratio sensor (not shown) detects the air-fuel ratio in an engine exhaust system. The vehicle sensor (not shown) detects the vehicle speed.

The ECU 60 conducts various controls regarding operation of the engine 10 (such as fuel injection control) based on the outputs of various sensors, and also controls the purge control valve 46, the electric air pump 51, the switch valve 52, and the like, to conduct purge control and failure diagnosis of the fuel vapor purge system 20.

In the fuel vapor purge system 20, according to an exemplary embodiment of the invention, fuel vapor generated in the fuel tank 21 during operation of the engine 10 flows into the canister 22 through the evaporation passage 23. The fuel vapor flowing into the canister 22 is temporarily adsorbed by the adsorbent contained in the canister 22.

If the purge control valve 46 is then opened in response to a control signal from the ECU 60, an intake negative pressure is introduced from the surge tank 12 into the canister 22 through the purge passage 24. At the same time, the atmosphere is introduced into the canister 22 through the atmosphere dust filter 49 and the atmosphere release port 25*b*. Because the negative pressure and the atmosphere are introduced into the canister 22, the fuel vapor adsorbed by the adsorbent of the canister 22 is desorbed. The fuel vapor thus desorbed is purged into the intake passage 11 through the purge passage 24.

If the ECU 60 is activated after the engine 10 is stopped, the ECU 60 controls operation of the electric air pump 51, and the switch valve 52 of the failure diagnosis apparatus, to conduct leakage failure diagnosis of the fuel vapor purge system 20.

In the failure diagnosis process of the fuel vapor purge system 20, the purge control valve 46 is kept opened according to a control command of the ECU 60. As shown in FIG. 2, the switch valve 52 is OFF. In other words, the switch valve 52 is connected to the atmosphere release port 25*b*. Since the atmosphere is introduced into the canister 22 through the atmosphere release port 25*b* and the atmosphere dust filter 49, the residual pressure (negative pressure) in the fuel vapor purge system 20 is removed, and the pressure in the fuel vapor purge system 20 reaches the atmospheric pressure.

With the electric air pump 51 stopped, the switch valve 52 is turned ON, as shown in FIG. 3. In other words, the switch valve 52 is switched to the electric air pump 51 side. As a result, the fuel vapor purge system 20 is closed, whereby a closed space is formed within the fuel vapor purge system 20. The pressure sensor 57 then detects a change in pressure Pb within the evaporation route caused by the fuel vapor generated in the fuel tank 21. The generation amount of fuel vapor is set to be detected within a short detection time TPb, e.g., one minute (see FIG. 4).

Thereafter, the switch valve 52 is turned OFF, as shown in FIG. 2. In other words, the switch valve 52 is switched to the atmosphere release port 25*b* side and the electric air pump 51 is operated. The air which is sucked and discharged from the electric air pump 51 flows through the bypass passage 53 and the reference orifice 54. The air then flows back through the switch valve 52 and is discharged into the atmosphere from the atmosphere release port 25*b*.

In this state, the pressure sensor 57 detects the pressure in the bypass passage 53 between the electric air pump 51 and the reference orifice 54. The detected pressure is used as a reference value Pr0 (see FIG. 4) for determining a leakage failure of the evaporation route. In an exemplary embodiment of the invention, the reference orifice 54 has the same diameter as that of a hole to be detected in the fuel vapor purge system 20. Therefore, even if there is a leakage failure in the evaporation route, degradation in pressurization capability of the electric air pump 51 caused by aging can be detected. Because the length of the bypass passage 53 between the electric air pump 51 and the reference orifice 54 is short, the pressure in this portion of the bypass passage 53 generated +by operation of the electric air pump 51 is saturated in a very short time. Accordingly, the electric air pump 51 need only be operated for a predetermined short operation time TPr (see FIG. 4) in order to detect the reference value. In the present embodiment, the operation time TPr of the electric air pump 51 is equal to the detection period of the reference value. After the pressure in the bypass passage 53 reaches the reference value Pr0, the pressure is retained at the reference value Pr0 for a short time. The electric air pump 51 is then stopped. As a result, the pressure in the bypass passage 53 is reduced to the atmospheric pressure.

Thereafter, the switch valve 52 is turned ON, as shown in FIG. 3. In other words, the switch valve 52 is switched to the electric air pump 51 side. The electric air pump 51 is then operated. As a result, the air sucked and discharged from the electric air pump 51 flows through the switch valve 52 into the canister 22 from the fresh-air introducing port 22*a* of the canister 22. The air flows through the canister 22 and into the purge passage 24 that extends from the fuel tank 21 to the purge control valve 46.

In this state, the pressure sensor 57 detects the pressure in the evaporation route. The detected pressure is used as a comparative value Pf (see FIG. 4) of the fuel vapor purge system 20. The volume of the contents of the evaporating route from the electric air pump 51, including the canister 22 and the fuel tank 21, varies depending on the amount of fuel remaining in the fuel tank 21. Accordingly, to detect the comparative value Pf, the electric air pump 51 is operated for a predetermined operation time TPf (see FIG. 4), which is set so that a predetermined comparative pressure can be obtained with the fuel tank 21 being almost empty. In the present embodiment, the operation time TPf of the electric air pump 51 is equal to the detection period of the comparative value.

Whether there is a leakage failure in the fuel vapor purge system 20 is determined by comparing the latest comparative value Pf detected in the comparative value detection period TPf with the reference value Pr0. The comparative value Pf calculated by pressurizing the evaporation route includes a pressure change caused by the fuel vapor generated in the fuel tank 21. However, the reference value Pr0 calculated by pressurizing the reference orifice 54 does not include a pressure change caused by the fuel vapor. Accordingly, in view of the level of the influence of the fuel vapor generated in the fuel tank 21, the reference value Pr0 is corrected to a value Pr1 (see FIG. 4) including the influence of the pressure caused by generation of the fuel vapor. The pressure value (Pr1-Pr0), which is added to the reference value Pr0 in view of the fuel vapor, is increased according to the ratio of the operation time TPf of the electric air pump 51 for detection of the comparative value to the detection time TPb of the generation amount of fuel vapor.

When the comparative value is detected, the electric air pump 51 is operated for the predetermined time TPf to pressurize the evaporation route. If it is determined in this period that the comparative value Pf is larger than the corrected reference value Pr1, it is determined that the evaporation route is in a normal state, i.e., the evaporation route has no hole. If it is determined in the above period that the comparative value Pf is equal to or smaller than the corrected reference value Pr1, it is determined that the evaporation route is in an abnormal state, i.e., the evaporation route has a hole.

Figure 4:
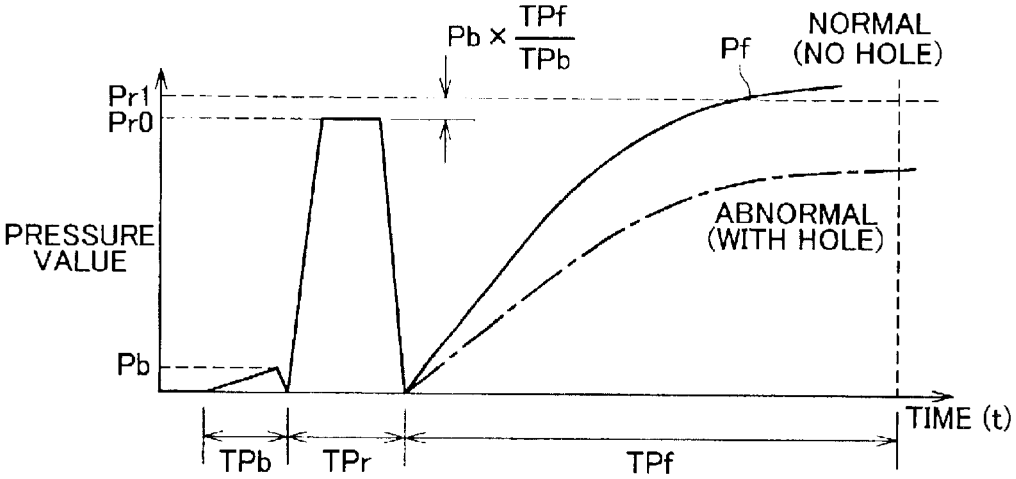
FIG. 4 is a timing chart illustrating failure diagnosis operation in the first embodiment of the invention in the case where the fuel vapor is generated.

FIG. 4 shows a failure diagnosis process of the fuel vapor purge system 20 in the case where the fuel vapor is generated in the fuel tank 21. As shown in FIG. 4, a pressure Pb caused by generation of the fuel vapor is detected in the detection time TPb of the generation amount of fuel vapor. The reference value Pr0 is then calculated in the reference value detection period TPr.

In the comparative value detection period TPf, the reference value Pr0 is corrected to the value Pr1 in view of the influence of the pressure caused by generation of the fuel vapor. If the comparative value Pf is larger than the reference value Pr1 in the comparative value detection period TPf, it is determined that the evaporation route is in a normal state, i.e., the evaporation route has no hole. However, if the comparative value Pf is equal to or smaller than the reference value Pr1 at the end of the comparative value detection period TPf, it is determined that the evaporation route is in an abnormal state, i.e., the evaporation route has a hole.

Figure 5:
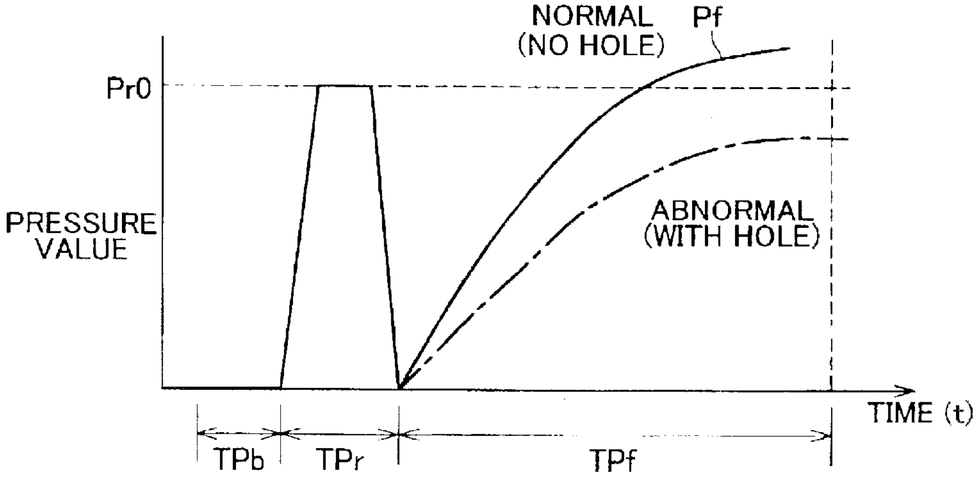
FIG. 5 is a timing chart illustrating failure diagnosis operation in the first embodiment of the invention in the case where the fuel vapor is not generated.

FIG. 5 shows a failure diagnosis process of the fuel vapor purge system 20 in the case where the fuel vapor is not generated in the fuel tank 21. As shown in FIG. 5, a pressure Pb caused by generation of the fuel vapor is zero in the detection time TPb of the generation amount of fuel vapor.

Accordingly, the reference value Pr0 is directly used as a reference value in the comparative value detection period TPf. Because the pressure Pb caused by generation of the fuel vapor is zero, the corrected reference value merely has the same value as the reference value Pr0. If the comparative value Pf is larger than the reference value Pr0 in the comparative value detection period TPf, it is determined that the evaporation route is in a normal state, i.e., the evaporation route has no hole. If the comparative value Pf is equal to or smaller than the reference value Pr0 at the end of the comparative value detection period TPf, it is determined that the evaporation route is in an abnormal state, i.e., the evaporation route has a hole.

In various exemplary embodiments of the invention, in the leakage failure diagnosis of the evaporation route, the calculated reference value Pr0 is corrected to the reference value Pr1 in view of the level of the influence of the fuel vapor generated in the fuel tank 21 on failure determination, and the corrected reference value Pr1 is used to determine a leakage failure. Whether there is a failure in the evaporation route is thus determined based on the reference value Pr1 and the comparative value Pf. Accordingly, the influence of a pressure change caused by the generated fuel vapor can be cancelled. As a result, whether there is a leakage failure can be determined with improved accuracy.

Whether there is a leakage failure in the evaporation route is determined based on comparison between the reference pressure value Pr0 calculated by pressurizing the reference orifice 54 and the comparative pressure value Pf calculated by pressurizing the evaporation route. This ensures that an accurate reference pressure value obtained in view of aging of the electric air pump 51 is used as a reference value for determining a leakage failure of the evaporation route. As a result, reduction in detection accuracy of a leakage failure can be prevented.

In various exemplary embodiments of the invention, the check valve 56 is provided at the discharge port 51*a* of the electric air pump 51. When the pressure at the discharge port 51*a* is lower than the pressure in the evaporation route, the check valve 56 is closed to disconnect the evaporation route from the outside air. The check valve 56 can thus prevent a pressure from leaking from the evaporation route during detection of the generation amount of fuel vapor in the fuel tank 21 and during detection of the comparative value during which the evaporation route is pressurized.

In various exemplary embodiments of the invention, the pressure sensor 57 is provided between the electric air pump 51 and the evaporation route and the reference orifice 54. Accordingly, by switching the switch valve 52, the pressure sensor 57 can detect the reference pressure value and the comparative pressure value for determining a leakage failure in the evaporation route. As a result, increase in the number of components can be suppressed.

In various exemplary embodiments of the invention, the electric air pump 51 for supplying the air is used as a pressure difference applying means. Therefore, the evaporation route can be pressurized by merely operating the electric air pump 51. Accordingly, whether there is a leakage failure in the evaporation route can be determined even when the engine 10 is stopped.

In the first exemplary embodiment, the comparative value is detected by pressurizing the evaporation route by the electric air pump 51. More specifically, the electric air pump 51 is operated for the predetermined time TPf so that a predetermined comparative pressure value can be obtained with the fuel tank 21 being almost empty. When the evaporation route is pressurized, however, the internal pressure of the evaporation route may be saturated to a value lower than the reference value Pr1 within the predetermined time TPf. In this case, the internal pressure of the evaporation route will no longer change.

Accordingly, whether there is a leakage failure in the evaporation route can be determined based on comparison between the comparative value Pf and the reference value Pr1 as soon as the internal pressure of the evaporation route is saturated. This enables reduction in time required for a failure diagnosis process. Moreover, the electric air pump 51 is stopped as soon as the internal pressure of the evaporation route is saturated. Therefore, unnecessary energy losses can be eliminated. Since the electric air pump 51 is not excessively operated, the life of the electric air pump 51 can be extended.

In a second exemplary embodiment of the invention, whether there is a leakage failure in the evaporation route is determined as soon as the internal pressure of the evaporation route exceeds the reference value Pr1 within the predetermined time TPf or is saturated to a value equal to or lower than the reference value Pr1 within the predetermined time TPf during pressurization of the evaporation route.

In the second exemplary embodiment, the engine 10 and the fuel vapor purge system 20 have the same structure as that of the first exemplary embodiment.

Figure 6:
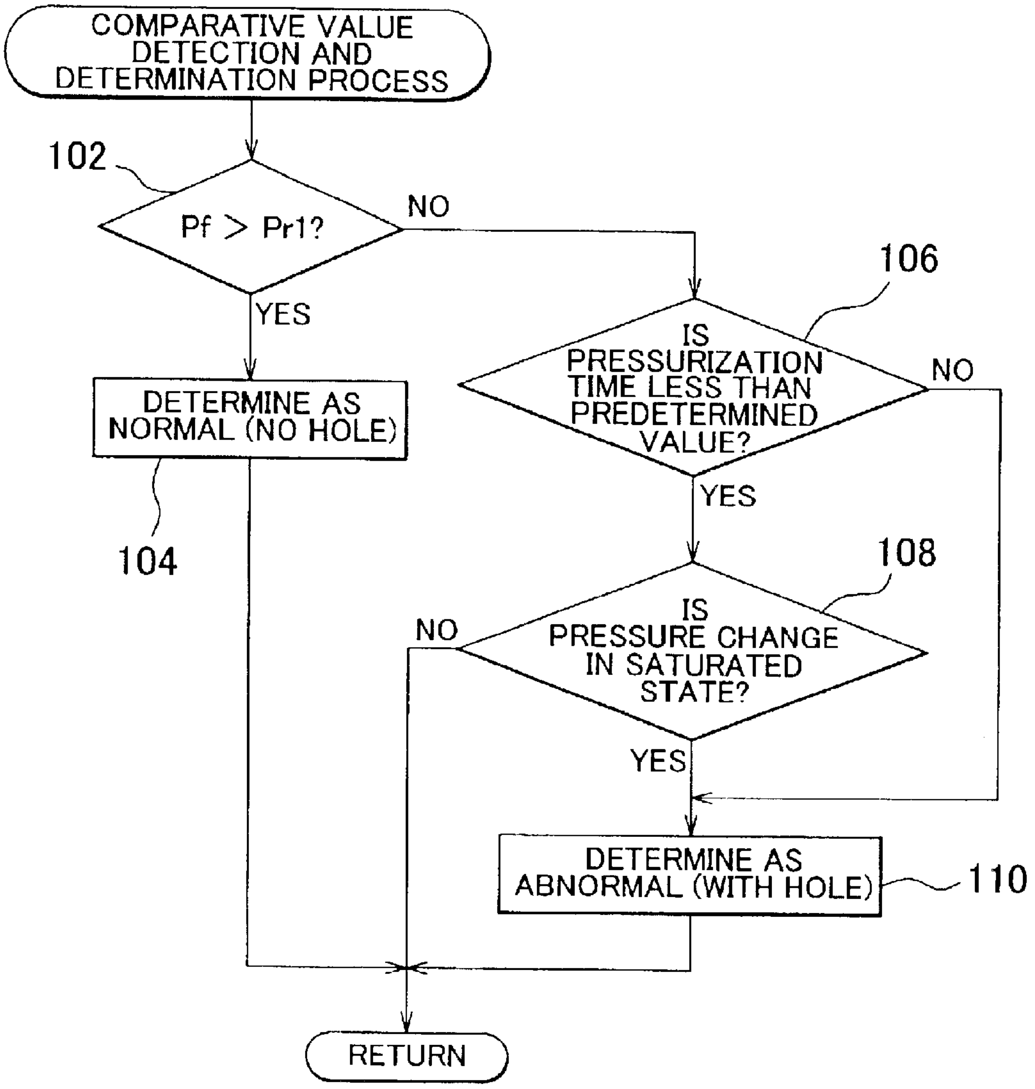
FIG. 6 is a flowchart illustrating operation of a failure diagnosis apparatus according to a second embodiment of the invention.

The leakage failure diagnosis process conducted by the ECU 60 of the present embodiment will be described with reference to the flowchart of FIG. 6. The flowchart of FIG. 6 shows only a part of the failure diagnosis process of the fuel vapor purge system 20. More specifically, FIG. 6 shows only a process of detecting a comparative value by pressurizing the evaporation route and a process of determining a leakage failure. Prior to these processes, the process of detecting a pressure Pb in the evaporation route caused by generation of the fuel vapor and the process of detecting the reference value Pr0 by pressurizing the reference orifice 54 are conducted in the same manner as that described above.

When the routine executed by the ECU 60 proceeds to the process of detecting a comparative value by pressurizing the evaporation route, it is determined in step 102 whether the detected comparative value Pf is larger than the reference value Pr1, i.e., the value corrected in view of the pressure of the fuel vapor. If it is determined that the comparative value Pf is larger than the reference value Pr1, the routine proceeds to step 104. If it is determined that the comparative value Pf is equal to or smaller than the reference value Pr1, the routine proceeds to step 106.

In step 104, the comparative value Pf is larger than the reference value Pr1. Therefore, even if the detection time of the comparative value has not reached the predetermined time TPf, the comparative value is immediately compared with the reference value, and it is determined that the evaporation route is in a normal state, i.e., the evaporation route has no hole and the electric air pump 51 is then stopped.

In step 106, it is determined whether the pressurization time of the evaporation route by the electric air pump 51 is less than the predetermined time TPf. If it is determined that the pressurization time is less than the predetermined time TPf, the routine proceeds to step 108. If it is determined that the pressurization time is equal to or longer than the predetermined time TPf, the routine proceeds to step 110.

If the routine proceeds from step 106 to step 110, the pressurization time has reached the predetermined time TPf. Therefore, the comparative value Pf is immediately compared with the reference value Pr1, and it is determined that the evaporation route is in an abnormal state, i.e., the evaporation route has a hole. The electric air pump 51 is then stopped, and the routine is terminated.

Figure 7:
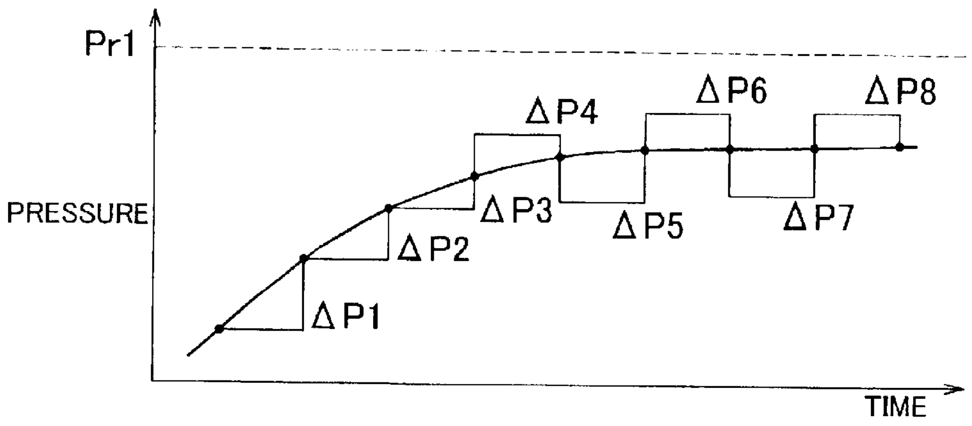
FIG. 7 illustrates a change in internal pressure in the case where an evaporation route has a hole in the second embodiment of the invention.
Figure 8:
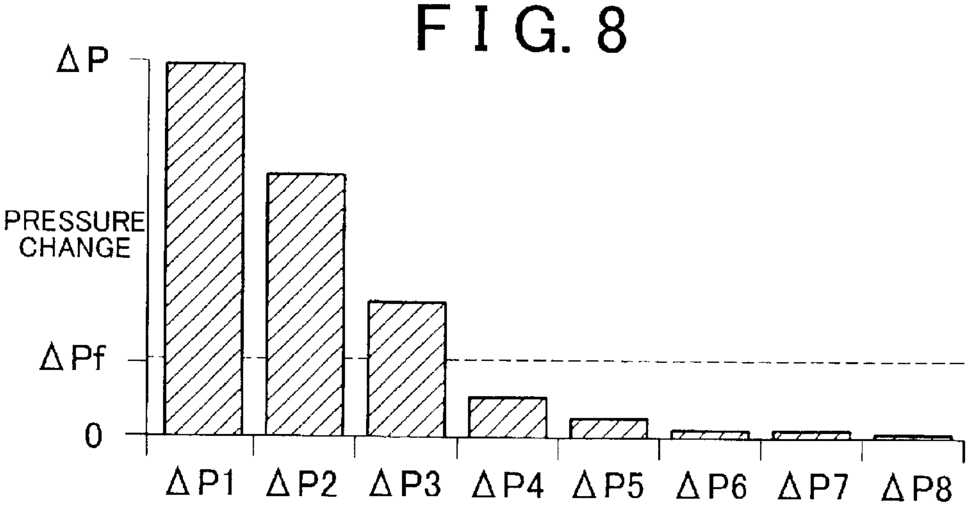
FIG. 8 illustrates calculation of a saturated state of the change in internal pressure in the second embodiment of the invention.

In step 108, it is determined whether a pressure change in the evaporation route is in the saturated state. As shown in FIG. 7, this determination is made by calculating a pressure change rate per unit time, in this case ΔP (ΔP1, ΔP2, . . . ), caused by operation of the electric air pump 51 during detection of the comparative value from pressurizing the evaporation route. As shown in FIG. 8, if the pressure change amount ΔP is less than a predetermined value ΔPf, it is determined that the pressure change is in the saturated state. If the pressure change in the evaporation route is saturated, the internal pressure of the evaporation route will no longer change. Therefore, the internal pressure of the evaporation route becomes stable at a value lower than the reference value Pr1.

If it is determined in step 108 that the pressure change is in the saturated state, the routine proceeds to step 110. If it is determined in step 108 that the pressure change is not in the saturated state, the routine is temporarily terminated.

If the routine proceeds from step 108 to step 110, the internal pressure of the evaporation route is stable at a value lower than the reference value Pr1 even if the pressurization time of the evaporation route is less than the predetermined time TPf. Therefore, it is determined that the evaporation route is in an abnormal state, i.e., the evaporation route has a hole. The electric air pump 51 is then stopped, and the routine is terminated.

Figure 9:
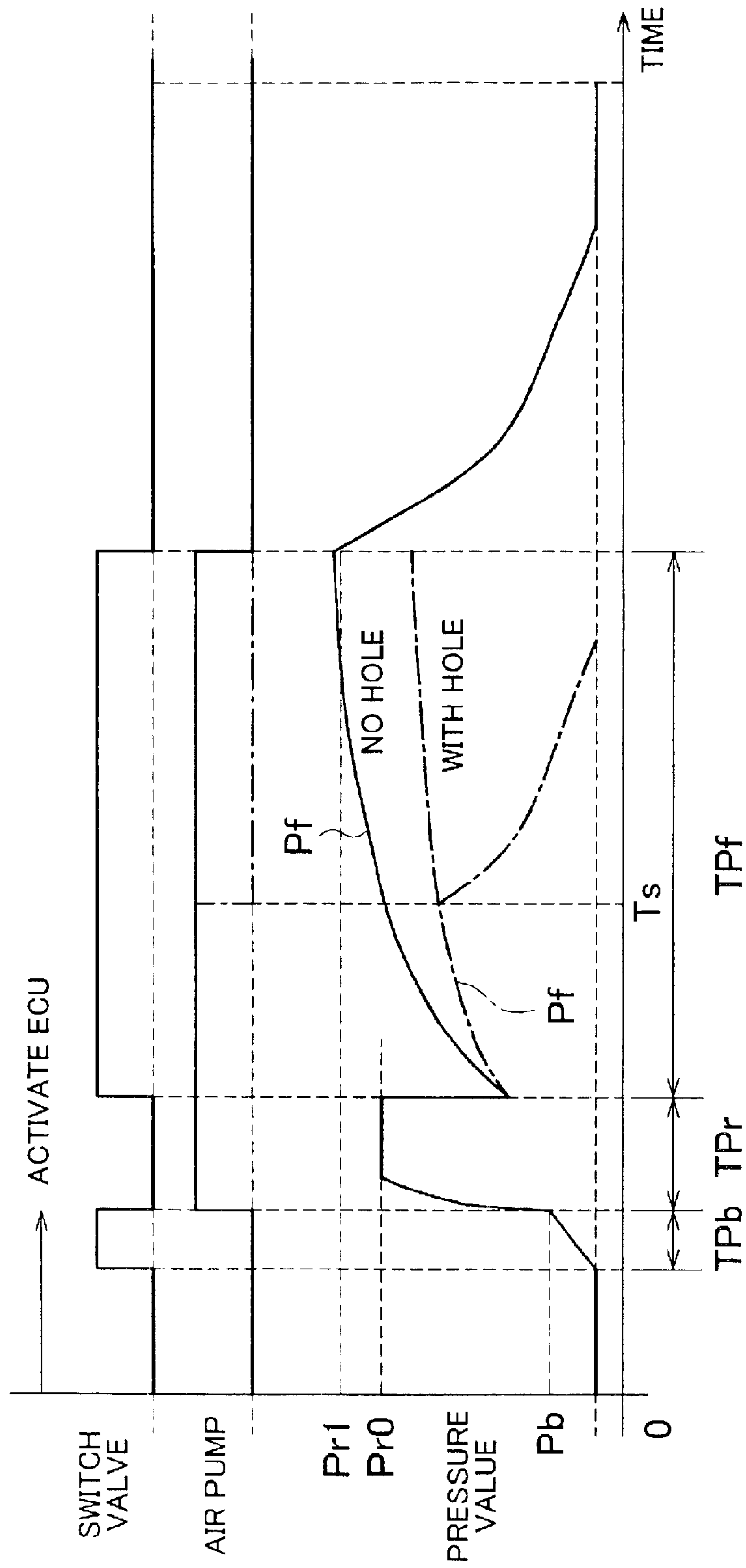
FIG. 9 is a timing chart illustrating operation of the failure diagnosis apparatus according to the second embodiment of the invention.

FIG. 9 illustrates the failure diagnosis process of the fuel vapor purge system 20 according to the present embodiment. In the embodiment, a pressure Pb caused by generation of the fuel vapor is detected in the detection time TPb of the generation amount of fuel vapor, and the reference value Pr0 is then calculated in the reference value detection period TPr.

In the comparative value detection time TPf, the reference value Pr0 is corrected to the value Pr1 in view of the influence of the pressure caused by generation of the fuel vapor. If the comparative value Pf becomes stable at a value lower than the reference value Pr1 during detection of the comparative value as shown by a chained line in FIG. 9, it is determined at time ts that the evaporation route is in an abnormal state, i.e., the evaporation route has a hole. The electric air pump 51 is then stopped. Thereafter, the switch valve 52 is turned OFF, and the residual pressure (positive pressure) in the evaporation route is removed. As a result, the pressure in the fuel vapor purge system 20 becomes equal to the atmospheric pressure.

If the reference value Pf exceeds the reference value Pr1 during detection of the comparative value as shown by a solid line in FIG. 9, it is determined that the evaporation route is in a normal state, i.e., the evaporation route has no hole. The electric air pump 51 is then stopped. Thereafter, the switch valve 52 is alternately turned ON and OFF, and the residual pressure (positive pressure) in the evaporation route is removed. As a result, the pressure in the fuel vapor purge system 20 becomes equal to the atmospheric pressure.

In various exemplary embodiments of the invention, if the operation time of the electric air pump 51 for pressurizing the evaporation route is less than the predetermined time TPf, the ECU 60 determines whether there is a failure in the evaporation route as soon as it is determined that a pressure change in the evaporation route becomes stable. This enables reduction in time required for failure diagnosis of the fuel vapor purge system 20. Moreover, the electric air pump 51 is stopped as soon as the pressure change in the evaporation route becomes stable. Therefore, unnecessary energy losses can be eliminated. Since the electric air pump 51 is not excessively operated, the life of the electric air pump 51 can be extended.

The invention is not limited to the above embodiments, and can be modified as described below. In this case, the same effects as those of the above embodiments can be obtained.

In the above exemplary embodiments, the reference orifice 54 and the evaporation route are pressurized by the electric air pump 51 in order to apply a positive pressure thereto. However, the reference orifice 54 and the evaporation route may alternatively be depressurized by sucking the air therefrom by the electric air pump 51 in order to apply a negative pressure thereto.

In the above exemplary embodiments, the reference pressure value Pr0 obtained by pressurizing the reference orifice 54 and the comparative pressure value Pf obtained by pressurizing the evaporation route are detected by the pressure sensor 57. However, these pressure values may alternatively be calculated based on the operating current value of the electric air pump 51.

In the above exemplary embodiments, the amount of fuel vapor generated in the fuel tank 21 is detected by the pressure sensor 57. However, the generation amount of fuel vapor may alternatively be calculated based on the detection result of a fuel temperature sensor for detecting a fuel temperature.

In the above exemplary embodiments, the corrected reference value Pr1, i.e., the sum of the reference value Pr0 obtained by pressurizing the reference orifice 54 and the pressure Pb caused by the fuel vapor, is calculated, and whether there is a failure is determined based on comparison between the reference value Pr1 and the comparative value Pf. However, a corrected comparative value, i.e., the comparative value Pf minus the pressure Pb caused by the fuel vapor, may be alternatively calculated, and whether there is a failure may be determined based on comparison between the corrected comparative value and the reference value Pr0.

In the above exemplary embodiments, the atmosphere introducing passage 25 allows the inlet port 48 provided within the fuel supply opening which is opened and closed by a fuel lid to communicate with the fresh-air introducing port 22*a* of the canister 22. The atmosphere entering from the inlet port 48 is thus introduced into the canister 22. However, the invention is not limited to this structure. For example, the atmosphere may alternatively be introduced into the canister 22 from a location other than the fuel supply opening.

In the exemplary embodiment, the controller (ECU 60) may be implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the sprit and scope of the invention.

What is claimed is:

1. A failure diagnosis apparatus of a fuel vapor purge system, the fuel vapor purge system including a fuel tank that stores fuel for an internal combustion engine, a canister that collects fuel vapor generated in the fuel tank, and an evaporation route that includes the fuel tank, the canister, an evaporation passage for introducing the fuel vapor generated in the fuel tank into the canister, and a purge passage for purging the fuel vapor collected in the canister into an intake passage of the internal combustion engine, the failure diagnosis apparatus comprising a controller that:

controls a pressure difference applying unit to applying a pressure difference between the evaporation route and outside air;

detects a level of an influence of the fuel vapor generated in the fuel tank on failure determination of the evaporation route;

detects both a pressure state obtained when the pressure difference applying unit communicates with a reference orifice communicating with the outside air and a pressure state obtained when the pressure difference applying unit communicates with the evaporation route;

determines whether there is a failure in the evaporation route in view of the level of the influence by comparing the former pressure state with the latter pressure; and determines whether a leak occurs when a pressure introducing set period does not elapse after the pressure becomes stable, wherein when a pressure difference application time to the evaporation route reaches a predetermined time, the controller determines whether there is a failure in the evaporation route regardless of the determination result that the pressure change in the evaporation route becomes stable.

2. The failure diagnosis apparatus according to claim 1, further comprising a cut-off unit, controlled by the controller, for disconnecting the evaporation route from the outside air.

3. The failure diagnosis apparatus according to claim 2, further comprising:

a switch valve for selectively connecting a fresh-air introducing port of the canister to an atmosphere release port and the pressure difference applying unit; and a bypass passage extending from the pressure difference applying unit to the fresh-air introducing port of the canister so as to bypass the switch valve, and having the reference orifice;

wherein the controller operates the pressure difference applying unit, switches the switch valve to the atmosphere release port, causes a pressure generated by the pressure difference applying unit to pass through the reference orifice of the bypass passage and the switch valve, then releases the pressure to the atmosphere from the atmosphere release port, and calculates the pressure thus released to the atmosphere as a reference value, operates the pressure difference applying unit, switches the switch valve to the pressure difference applying unit, causes a pressure generated by the pressure difference applying unit to pass through the switch valve, then supplies to the evaporation route from the fresh-air introducing port of the canister, and calculates the pressure thus supplied to the evaporation route as a comparative value, and determines whether there is a failure in the evaporation route by comparing the reference value with the comparative value.

4. The failure diagnosis apparatus according to claim 3, wherein the pressure difference applying unit is an electric air pump for supplying or sucking air.

5. The failure diagnosis apparatus according to claim 3, wherein the controller determines when a pressure change in the evaporation route becomes stable, based on a pressure change rate of the evaporation route, and determines a timing of determining whether there is a failure in the evaporation route based on the determination result that the pressure change in the evaporation route becomes stable.

6. The failure diagnosis apparatus according to claim 5, wherein when a pressure difference application time to the evaporation route is less than a predetermined time, the controller determines whether there is a failure in the evaporation route upon determining that the pressure change in the evaporation route becomes stable.

7. The failure diagnosis apparatus according to claim 3, further comprising a pressure sensor, coupled the controller, and the pressure sensor is provided between the pressure difference applying unit and the evaporation route.

8. The failure diagnosis apparatus according to claim 1, further comprising:

a switch valve for selectively connecting a fresh-air introducing port of the canister to an atmosphere release port and the pressure difference applying unit;

a bypass passage extending from the pressure difference applying unit to the fresh-air introducing port of the canister so as to bypass the switch valve, and having the reference orifice;

wherein the controller operates the pressure difference applying unit and switching the switch valve to the atmosphere release port, causes a pressure generated by the pressure difference applying unit to pass through the reference orifice of the bypass passage and the switch valve, then releases the pressure to the atmosphere from the atmosphere release port, and the pressure thus released to the atmosphere is calculated as a reference value, by operating the pressure difference applying unit and switching the switch valve to the pressure difference applying unit, a pressure generated by the pressure difference applying unit is caused to pass through the switch valve and is then supplied to the evaporation route from the fresh-air introducing port of the canister, and calculates the pressure thus supplied to the evaporation route as a comparative value; and determines whether there is a failure in the evaporation route by comparing the reference value with the comparative value.

9. The failure diagnosis apparatus according to claim 1, wherein the controller determines that a pressure change in the evaporation route becomes stable, based on a pressure change rate of the evaporation route, and determines a timing of determining whether there is a failure in the evaporation route based on the determination result that the pressure change in the evaporation route becomes stable.

10. The failure diagnosis apparatus according to claim 9, wherein when a pressure difference application time to the evaporation route is less than a predetermined time, the controller determines whether there is a failure in the evaporation route upon determining that the pressure change in the evaporation route becomes stable.

11. A failure diagnosis method of a fuel vapor purge system, the fuel vapor purge system including a fuel tank for storing fuel for an internal combustion engine, a canister for collecting fuel vapor generated in the fuel tank, and an evaporation route including the fuel tank, the canister, an evaporation passage for introducing the fuel vapor generated in the fuel tank into the canister, and a purge passage for purging the fuel vapor collected in the canister into an intake passage of the internal combustion engine, the method comprising the steps of:

detecting a level of an influence of the fuel vapor generated in the fuel tank on failure determination of the evaporation route;

detecting a pressure state obtained when a pressure difference applying unit for applying a pressure difference between the evaporation route and outside air communicates with a reference orifice communicating with the outside air;

detecting a pressure state obtained when the pressure difference applying unit communicates with the evaporation route; and determining whether there is a failure in the evaporation route in view of the level of the influence by comparing the former pressure state with the latter pressure state;

determining whether a leak occurs when a pressure introducing set period does not elapse after the pressure becomes stable, determining when a pressure difference application time to the evaporation route reaches a predetermined time; and determining whether there is a failure in the evaporation route regardless of the determination result that the pressure change in the evaporation route becomes table.

12. The failure diagnosis method according to claim 11, further comprising the steps of:

operating the pressure difference applying unit;

switching a switch valve to an atmosphere release port so that a pressure generated by the pressure difference applying unit is caused to pass through the reference orifice of a bypass passage and the switch valve and is then released to atmosphere from the atmosphere release port;

calculating the pressure thus released to the atmosphere as a reference value, the bypass passage being a passage extending from the pressure difference applying unit to a fresh-air introducing port of the canister so as to bypass the switch valve, and having the reference orifice, and the switch valve being a valve for selectively connecting the fresh-air introducing port of the canister to the atmosphere release port and the pressure difference applying unit;

operating the pressure difference applying unit and switching the switch valve to the pressure difference applying unit so that a pressure generated by the pressure difference applying unit is caused to pass through the switch valve and is then supplied to the evaporation route from the fresh-air introducing port of the canister;

calculating the pressure thus supplied to the evaporation route as a comparative value; and determining whether there is a failure in the evaporation route by comparing the reference value with the comparative value.

13. The failure diagnosis method according to claim 12, further comprising the steps of:

determining when a pressure change in the evaporation route becomes stable, based on a pressure change rate of the evaporation route; and determining a timing of determining whether there is a failure in the evaporation route, based on the determination result that the pressure change in the evaporation route becomes stable.

14. The failure diagnosis method according to claim 11, further comprising the steps of:

determining when a pressure change in the evaporation route becomes stable, based on a pressure change rate of the evaporation route; and determining a timing of determining whether there is a failure in the evaporation route, based on the determination result that the pressure change in the evaporation route becomes stable.

15. The failure diagnosis method according to claim 14, further comprising the steps of:

determining when a pressure difference application time to the evaporation route is less than a predetermined time; and determining whether there is a failure in the evaporation route upon determining that the pressure change in the evaporation route becomes stable.

* * * * *